United States Patent [19]

Veyssiere

[11] 4,442,370
[45] Apr. 10, 1984

[54] BRUSH LEAD RETAINER FOR AN ELECTRICAL MACHINE

[75] Inventor: Gerard Veyssiere, Issoire, France
[73] Assignee: Ducellier & Cie, France
[21] Appl. No.: 298,780
[22] Filed: Sep. 2, 1981
[30] Foreign Application Priority Data
Oct. 23, 1980 [FR] France ............... 80 22645
[51] Int. Cl.³ .......................... H02K 13/00
[52] U.S. Cl. .................. 310/239; 310/71; 310/249
[58] Field of Search ......... 339/61 R, 59 R, 255 K; 310/71, 89, 239, 249, 235; 174/94 R
[56] References Cited
U.S. PATENT DOCUMENTS
3,483,408  12/1969  Frohmüller et al. ............ 310/71
3,636,393  1/1972  Pieper ........................... 310/249
3,979,615  9/1976  Neff ............................. 310/71

Primary Examiner—J. D. Miller
Assistant Examiner—D. L. Rebsch

[57] ABSTRACT

This device is intended for the retaining brush lead connections for motor vehicle starters and is in the form of a bridging piece or retainer which includes a longitudinal hole permitting the passage of a tie element, and a groove parallel to this longitudinal hole in which are held the brush lead and a connection between windings. The bottom of this groove is formed with a resiliently deformable lip, and the device has a peripheral ring which is resiliently deformable, the deformation of the lip and of the ring during assembly ensuring effective retention, by pressure, between the brush lead and the connection.

1 Claim, 2 Drawing Figures

BRUSH LEAD RETAINER FOR AN ELECTRICAL MACHINE

The present invention concerns a device for retaining or immobilizing the brush lead connections of electrical machines, particularly for motor vehicle starters.

In certain starters of this kind, at least one flexible brush lead is of great length and lies alongside on the one hand, a tie element of the starter assembly and, on the other hand, a rigid connection which connects two inductor windings. It is known that starters are subject to numerous vibrations and their brush leads have a tendency to wear by rubbing against the tie element and the rigid connection which connects the inductor windings.

The present invention has for an object to eliminate this wear by immobilizing the flexible brush lead with respect to the tie element and to the rigid connection.

According to the invention, a device for immobilizing the brush lead connections of electrical machines, particularly for motor vehicle starters, is characterized in that it is formed as a retainer disposed so as to co-operate with the brush lead, tie element and connection between windings, and is retained, in use, by gripping between the interior of the end support or bracket of the machine and the connection between windings.

The following description with reference to the accompanying drawings will facilitate a better understanding of how the invention can be carried out.

Figure 1:
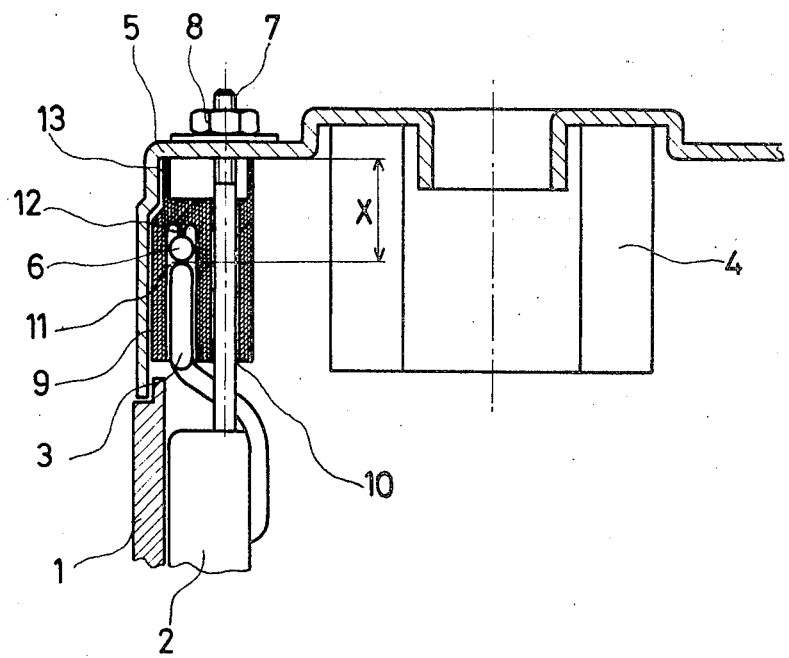
Figure 2:
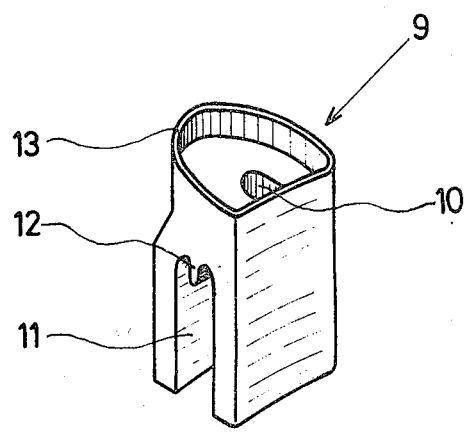

FIG. 1 is a view partially in section of a starter equipped with the immobilizing device according to the invention, and FIG. 2 is a perspective view of the immobilizing device itself.

The vehicle starter partially shown in FIG. 1 includes a casing 1 within which inductor windings 2 are retained by means of polar masses (not shown). The inductor windings 2 are connected together by connections 3 between the windings. A casing part 5 supports the brush-carrying assembly 4 of which at least one of the brushes includes a flexible brush lead 6 of substantial length. The various elements are immobilized by means of tie rods 7 of which the free threaded ends pass through the end bracket 5 and are immobilized by a washer and nut assembly 8.

According to the invention an immobilizing device 9 is disposed so as to co-operate with the tie rod 7, the connection between the windings 3, the brush lead 6 and the end bracket 5.

This device 9 is in the form of a retainer of insulating material which includes a longitudinal substantially cylindrical hole 10 surrounding a part of the tie rod 7 and, parallel with this hole 10, a groove 11 in which are positioned the brush lead 6 and the connection 3 between windings.

In order to avoid rubbing of the brush lead 6 on the connection 3 it is necessary to provide an effective immobilization between these two elements. In order to do this, a resiliently deformable lip 12 is produced integrally with the bottom of the groove 11 and an integral ring or lip 13 is also provided towards the end of the device 9 opposed to the groove 11 following the external form of the device 9 so as to be resiliently deformable.

The lip 12 and the ring 13 thus ensure an effective immobilizing contact of the brush lead 6 against the connection 3 whilst taking up the possible variations due to manufacturing tolerances of the dimension X (see FIG. 1) between the end of the connection 3 and the interior of the end bracket 5.

The immobilization of the various elements is then obtained by gripping of the device 9 between the rigid connection 3, the brush lead 6 and the end bracket 5 by means of resiliently deformable portions, lip 12 and ring 13.

I claim:

1. A device for immobilizing the brush lead connections of electrical machines, particularly for motor vehicle starters, which includes a housing, inductor windings held against said housing, connections formed between said windings, an end support on which is mounted a brush carrying assembly of which at least one of the brushes includes a flexible brush lead of substantial length, the starter assembly being held together by means of tie rods situated near to the brush lead and to one of said connections, the device being characterized in that it is constituted by a retainer disposed, when assembled, so as to cooperate with the brush lead, tie rod and connection between windings and being adapted to be held in position by gripping between the interior of the end support and said connection, by virtue of a resiliently deformable lip integrally formed at the bottom of a groove extending inwardly from one end of the retainer parallel to a longitudinal hole through which passes the tie rod, and also of an annular resiliently deformable ip surrounding the external periphery of the other end of the retainer.

* * * * *